March 28, 1933.  S. E. BRAY  1,902,989
ANGLE MULTISECTOR
Filed Sept. 29, 1931   3 Sheets-Sheet 1

INVENTOR
STUART E. BRAY.
BY
ATTORNEY

March 28, 1933.  S. E. BRAY  1,902,989
ANGLE MULTISECTOR
Filed Sept. 29, 1931   3 Sheets-Sheet 3

INVENTOR
STUART E. BRAY.
BY
ATTORNEY

Patented Mar. 28, 1933

1,902,989

UNITED STATES PATENT OFFICE

STUART E. BRAY, OF THE UNITED STATES NAVY

ANGLE MULTISECTOR

Application filed September 29, 1931. Serial No. 565,808.

(GRANTED UNDER THE ACT OF MARCH 3, 1883, AS AMENDED APRIL 30, 1928; 370 O. G. 757)

This invention relates to the dividing of an angle into any number of equal parts and has for its object the accomplishment of the above by draftsman's curves known as angle multisectors, the curved portion of which follows curves obtained by the geometrical constructions hereinafter described and claimed.

The method of obtaining said curves can be better understood by reference to the accompanying drawings in which, Figure 1 shows the method of obtaining the curve for the division of an angle into three parts and the use of said curve to trisect a given angle, Figure 2 shows the method of obtaining the curve for the division of an angle into seven parts and the use of said curve to divide a given angle into 7 parts, and Figures 3 and 4 show constructed draftsman's curves for dividing angles respectively into three and seven equal parts.

In connection with Fig. 1 the procedure in constructing trisecting curve and use of said curve is as follows:

At O erect OZ perpendicular to OA.

With O as a center describe an arc ZBA of any convenient radius subtending the angle ZOA. On the arc ZBA lay off points 1, 2, 3 etc., the intervening arcs being of small convenient length, not necessarily equal but more convenient if equal. On the arc ZBA lay off points 1', 2', 3' etc. so that arcs A1', A2', A3' etc. are respectively three times arcs A1, A2, A3 etc. From points 1', 2', 3' etc. drop perpendiculars on line ZO. From points 1, 2, 3 etc., with a radius equal to ZO describe arcs cutting the perpendicular corresponding respectively to points 1', 2', 3' etc. at points 1'', 2'', 3'' etc. Draw a smooth curve through points 1'', 2'', 3'' etc. From B drop a perpendicular on line ZO, intersecting curve 1'', 2'', 3'' etc. at O'. From O' as a center with a radius equal to ZO, describe an arc cutting arc ZBA at C. The angle AOC is one third of the angle AOB.

From the construction it is clear that the curve 1'', 2'', 3'' etc. is the locus of all points determined by dropping perpendiculars from points on an arc of a quadrant to a first side of the quadrant and intersecting said perpendiculars by arcs whose radii are equal to the radius of the quadrant and whose centers are on the arc of the quadrant and at points which mark one third of the arcs intervening between a second side of the quadrant and the points from which said respective perpendiculars are dropped. The smaller arcs having been marked first and the larger arc determined from the smaller arcs by tripling. Hence when the curve has been constructed the reverse operation will determine one third of an arc of any size up to ninety degrees.

That is, from any point on the arc of the quadrant drop a perpendicular to the first side of the quadrant and with a center at the point where the perpendicular intersects the curve and with a radius equal to the radius of the quadrant strike an arc intersecting the arc of the quadrant. The point thus determined on the arc of the quadrant marks one third of the intervening arc between the second side of the quadrant and the point from which the perpendicular is dropped. The trisection of the arc is completed by compasses with a center at the point marking one third of the arc and a radius equal to the corresponding chord intersect the remaining arc to determine the final point of the trisection.

The constructed curve could be continued for 180°. However, for angles greater than ninety degrees it is easier to bisect the angle and then trisect one of the halves. The resulting arc can be doubled by compasses and then doubled again to trisect the larger angle. For angles between 180° and 360° quarter the angle and then quadruple the resulting arc to get the final trisection.

The method just described may be used for dividing an angle into any number of equal parts. Figure 2 shows the method of obtaining the curve for dividing an angle into seven equal parts and its application to angle AOB. The construction of the curve is identical with that in Figure 1, except that arcs A1', A2', A3' etc. are respectively seven times arcs A1, A2, A3 etc.

Draftman's curves may be constructed for dividing angles into any number of equal parts. For example very accurate draftman's curves may be made for trisecting angles to be used with quadrants of various radii such as one inch, two inches, three inches, four inches, etc. Also, other series of curves could be constructed for dividing angles into four equal parts, five equal parts, six equal parts etc. The curves should have a straight edge at the base for aligning on a side of the right angle and the curved edge should be adapted for guiding a marking instrument such as a pencil or pen in tracing the curve. It is preferred to construct the curves for aligning on the non-common side of the right angle of the quadrant, although they could be constructed for alignment on the common side of the right angle.

With the draftsman's curves the operation of trisecting an angle would be as follows: Construct the right angle as previously described. Draw in the arc of the quadrant with a convenient radius and also one for which you have the constructed curve for trisecting angles. Align the straight edged base of the constructed curve with the non-common side of the right angle and draw in the curve by moving a pen or pencil along the curved edge of the constructed curve. Drop a perpendicular from the point of intersection of the quadrant with the non-common side of the angle to the non-common side of the right angle. With the point of intersection of this perpendicular with the drawn curve as a center and a radius equal to the radius of the quadrant strike an arc intersecting the quadrant. The point thus determined on the quadrant marks one third of the intervening arc between the common side of the right angle and the point from which the perpendicular is dropped.

Then to divide an angle into any number of equal parts use a convenient size of the corresponding properly constructed curve.

Figure 1:
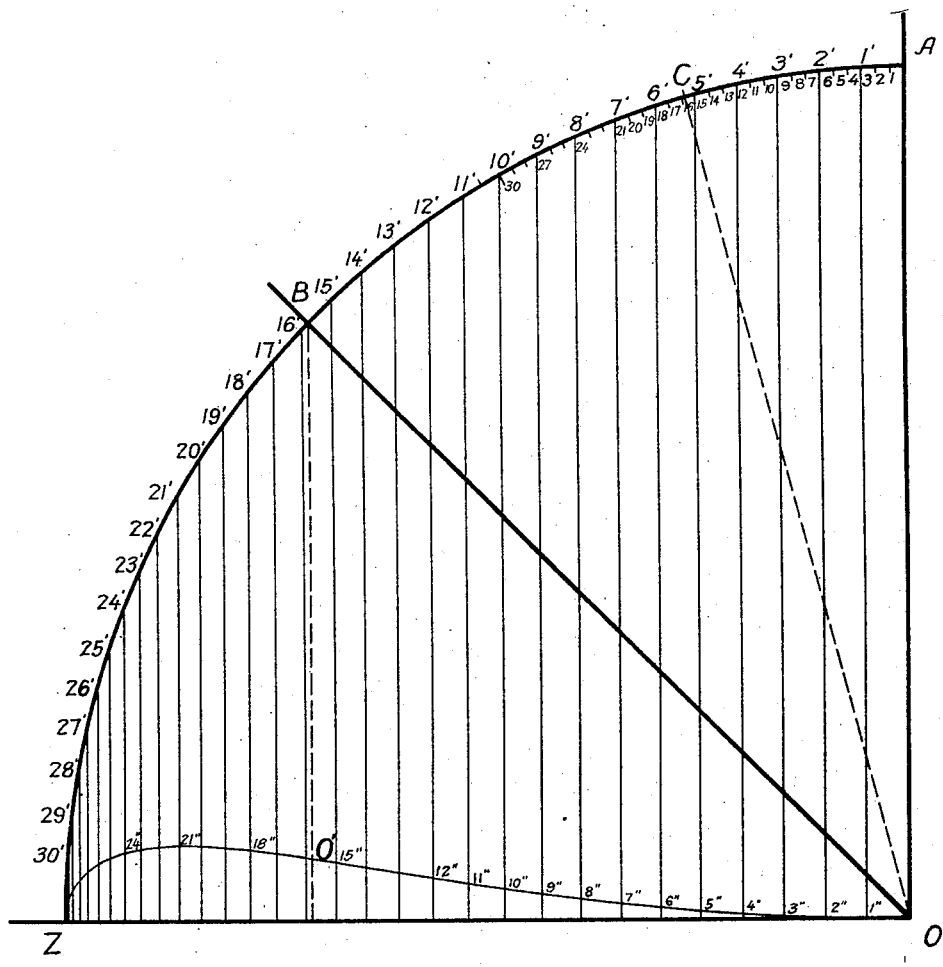
Figure 2:
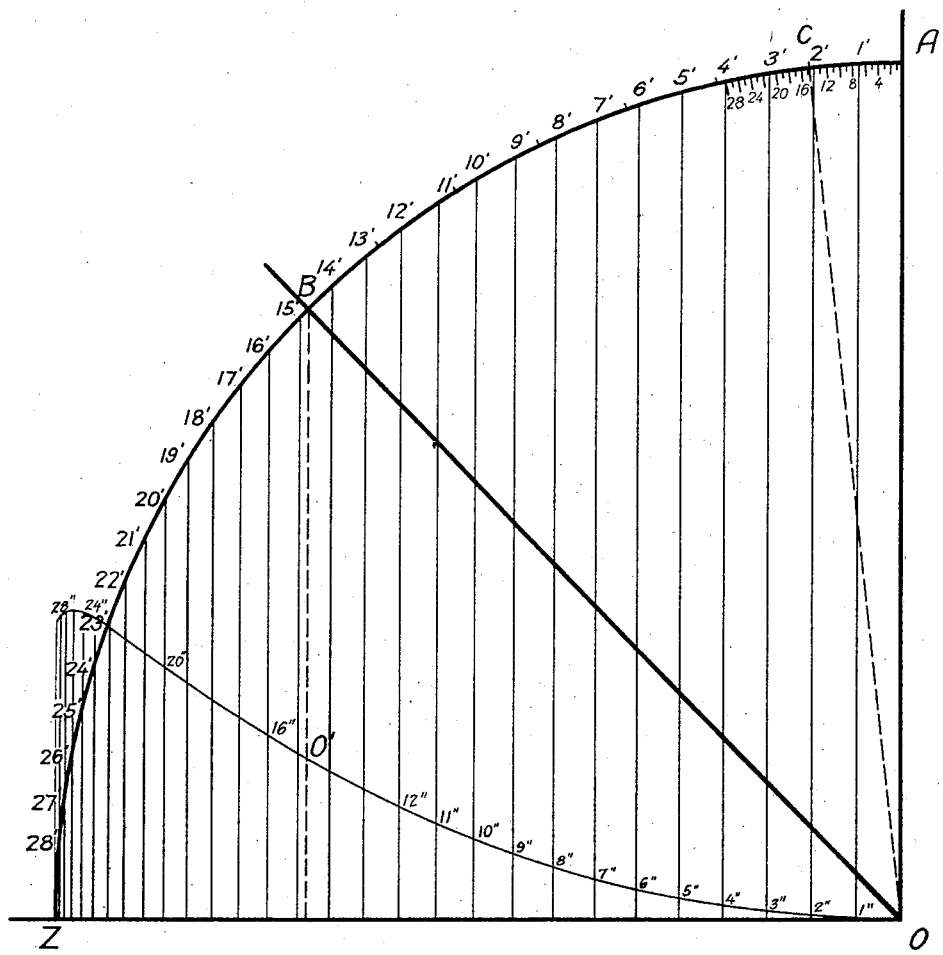
Figure 3:
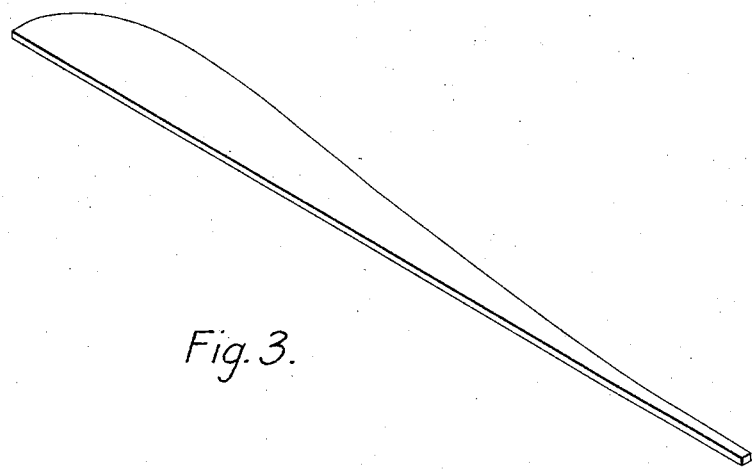
Figure 3 shows a properly constructed curve for trisecting angles for use on the non-common side of the right angle and for a quadrant with a radius of six and one half inches.
Figure 4:
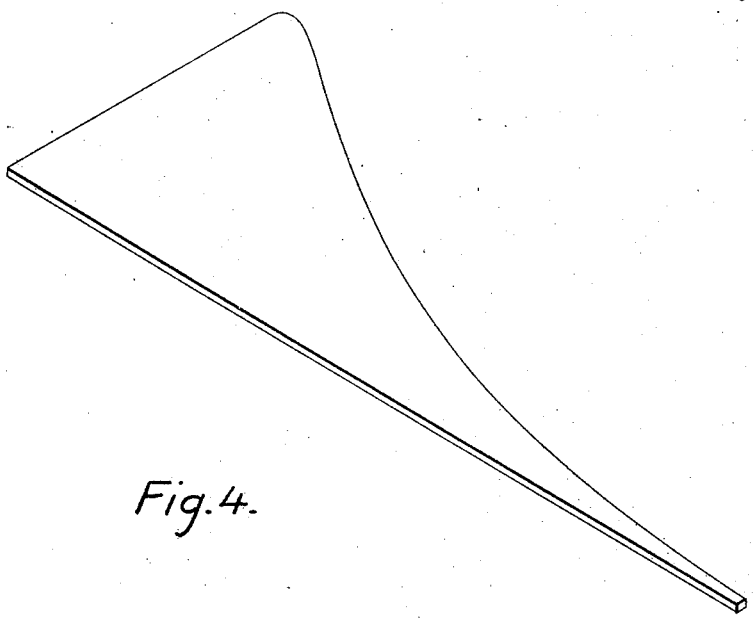
Figure 4 shows a similar properly constructed curve for dividing an angle into seven equal parts. It, too, is for use on the non-common side of the right angle and for a quadrant with a radius of six and one half inches.

It is desired that the above embodiment of the invention shall be regarded as illustrative of the invention and not restricted, and that the appended claims be construed broadly, except insofar as it may be necessary to impose limitations in view of the prior art.

The herein described invention may be manufactured and used by or for the Government of the United States for governmental purposes without the payment to me of any royalties thereon.

I claim:

1. An article of manufacture known as an angle multisector consisting of a draftman's curve for use in trisecting an angle which comprises a straight edged base of convenient length and a curved edge which is the locus of points determined by the intersections of perpendiculars to a first side from points on the arc of an associated quadrant and arcs of radii equal to the radius of said quadrant with centers which mark one third of the arcs intervening between a second side of the quadrant and the points from which the respective perpendiculars are dropped substantially as herein shown and described.

2. An article of manufacture known as an angle multisector, consisting of a draftman's curve, for use in dividing an angle into "n" equal parts, "n" being any integer, which comprises a straight-edged base of convenient length and a curved edge which is the locus of points determined by the intersections of perpendiculars to a first side from points on the arc of an associated quadrant and arcs of radii equal to the radius of the quadrant with centers which mark one "nth" of the arcs intervening between a second side of the quadrant and the points from which the respective perpendiculars are dropped substantially as herein shown and described.

STUART E. BRAY.